Oct. 21, 1969  R. T. EDDY  3,473,326
HYDRAULIC TRANSMISSION
Filed Oct. 11, 1967  4 Sheets-Sheet 1

INVENTOR
ROBERT T. EDDY
BY
*M. A. Hobbs*
ATTORNEY

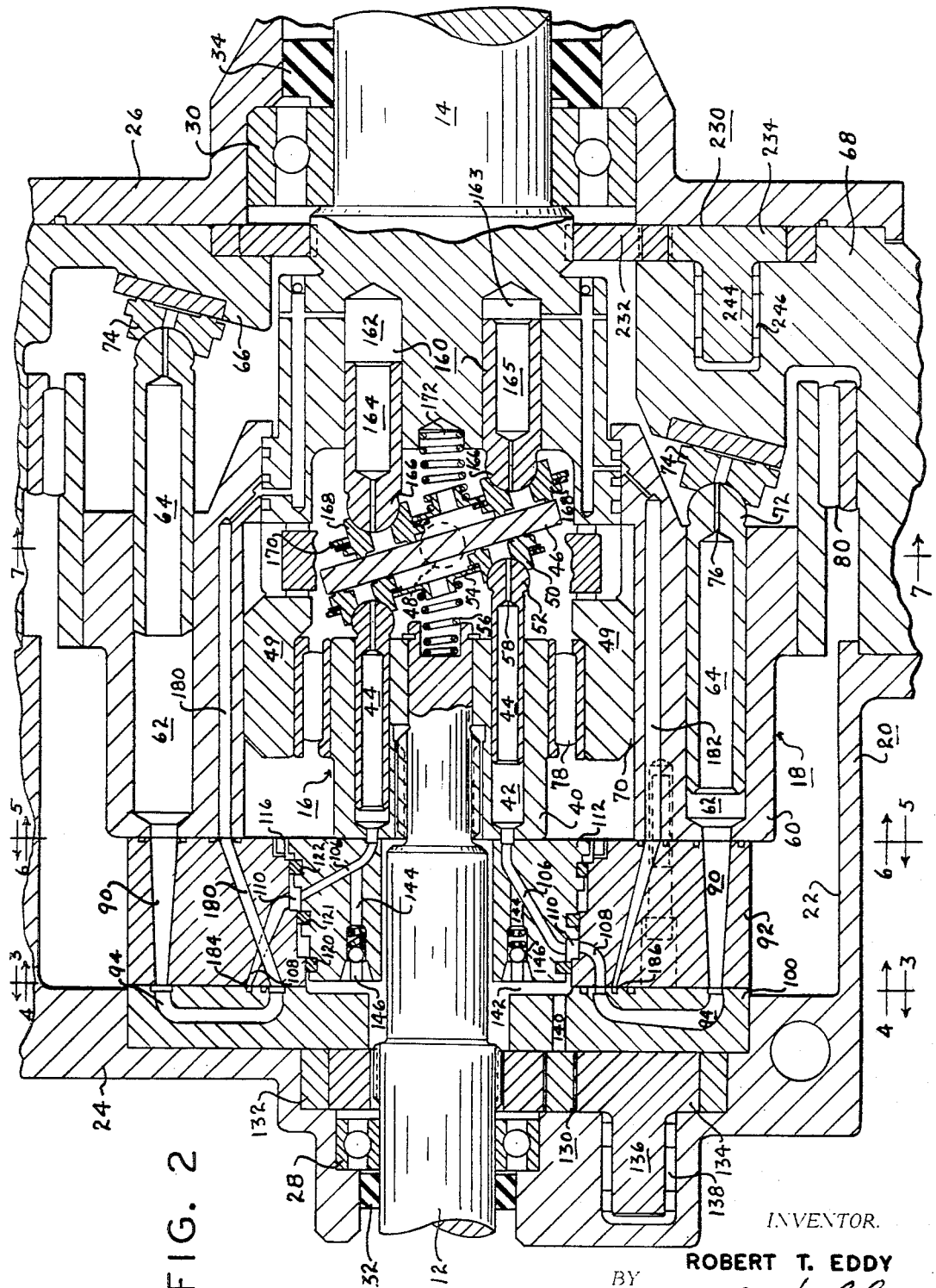

INVENTOR.
ROBERT T. EDDY
BY M. A. Hobbs
ATTORNEY

United States Patent Office 3,473,326
Patented Oct. 21, 1969

3,473,326
HYDRAULIC TRANSMISSION
Robert T. Eddy, South Bend, Ind., assignor to The Reliance Electric Engineering Company, a corporation of Ohio
Filed Oct. 11, 1967, Ser. No. 674,388
Int. Cl. F16d *31/02;* F16h *39/00*
U.S. Cl. 60—53                                    9 Claims

ABSTRACT OF THE DISCLOSURE

A hydraulic transmission having aligned input and output shafts, a multiple piston pump driven by the input shaft, a multiple piston motor for driving the output shaft, and a mechanical means interconnecting the input and output shafts, including a wobble plate interposed between the inner ends of the two shafts for controlling the output of the pump and for transmitting the driving force between the two shafts.

---

In conventional hydraulic transmissions, a combination of a pump and motor is normally used in which the pump is merely coupled hydraulically with the motor and in which the pump is driven at a constant speed and the output of the pump is varied either by manual control or automatically in response to varying speed or torque conditions. These conventional hydraulic transmissions, while satisfactory for a number of applications, have in the past had a number of inherent disadvantages or difficulties which have prevented them from being suitable for some power transmission applications or performing satisfactorily for extended periods of time under various operating conditions, some of the difficulties, for example, involving high dynamic pressures which create fluid sealing problems and excessive wear of bearings and other moving parts, limited speed and torque ranges, relatively large units structurally for their capacity, and complicated and/or unreliable control mechanisms for varying the speed and torque output of the motor. It is therefore one of the principal objects of the present invention to provide a hydraulic transmission having a wide range of speed and torque capacities for a given size of pump and motor combination, and being efficient in operation and compact in structure such that it can be readily adapted to a wide variety of applications.

Another object of the invention is to provide a hydraulic transmission of the aforesaid type in which the torque reaction of the input shaft is utilized and the force transmitted directly to the output shaft of the motor to vary the speed and torque ranges of the transmission, and which is so constructed and designed that the inherently high pressures of a hydraulic transmission are balanced and counteracted to eliminate the need for high pressure dynamic fluid seals, thus permitting effective and efficient utilization of high pressures without the likelihood of leakage or structural failure.

Still another object of the invention is to provide a self-contained, compact hydraulic transmission which can be effectively and accurately controlled both manually and automatically to give the desired speed and/or torque output with a constant speed input, and which utilizes internal pressures for both the power transmission and control requirements.

Further objects and advantages of the invention will become apparent from the following description and accompanying drawings, wherein:

FIGURE 2 is a vertical cross sectional view of the transmission shown in FIGURE 1, the section being taken on line 2—2 of the latter figure;

Figures 1, 3:
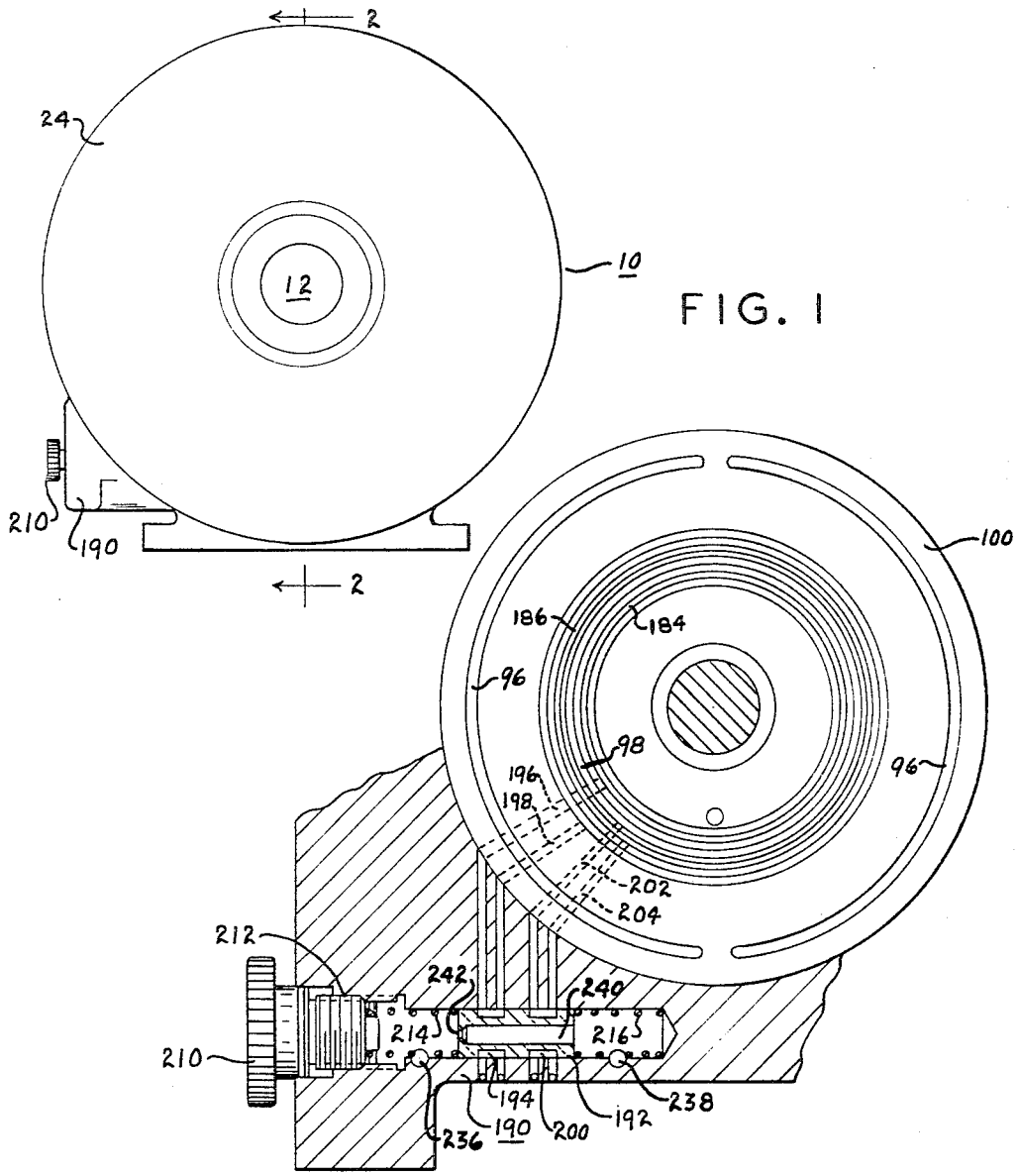
FIGURE 1 is an elevational view of one end of the present hydraulic transmission.
FIGURE 3 is a transverse cross sectional view, taken on line 3—3 of FIGURE 2.
Figure 4:
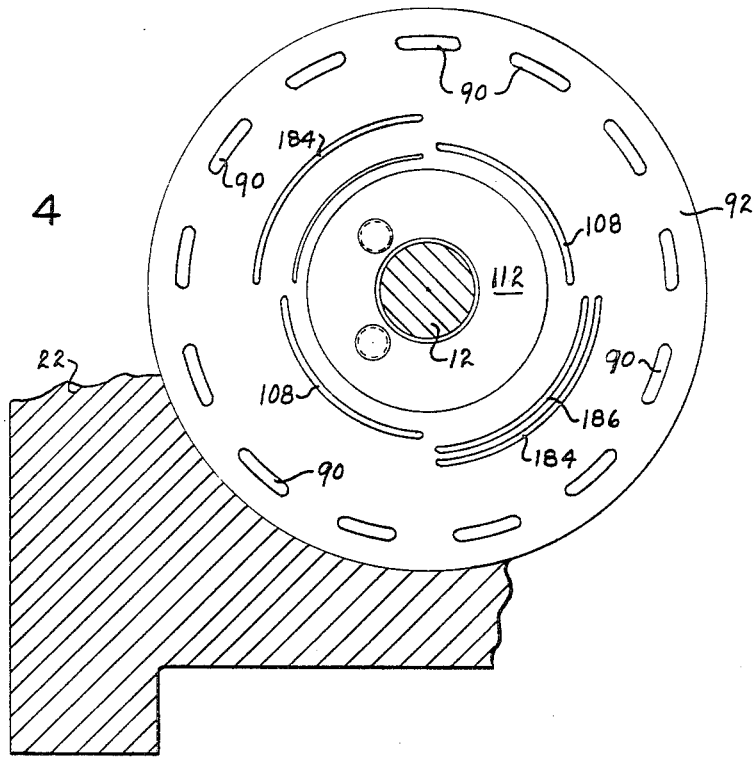
FIGURE 4 is a transverse cross sectional view, taken on line 4—4 of FIGURE 2.
Figure 5:
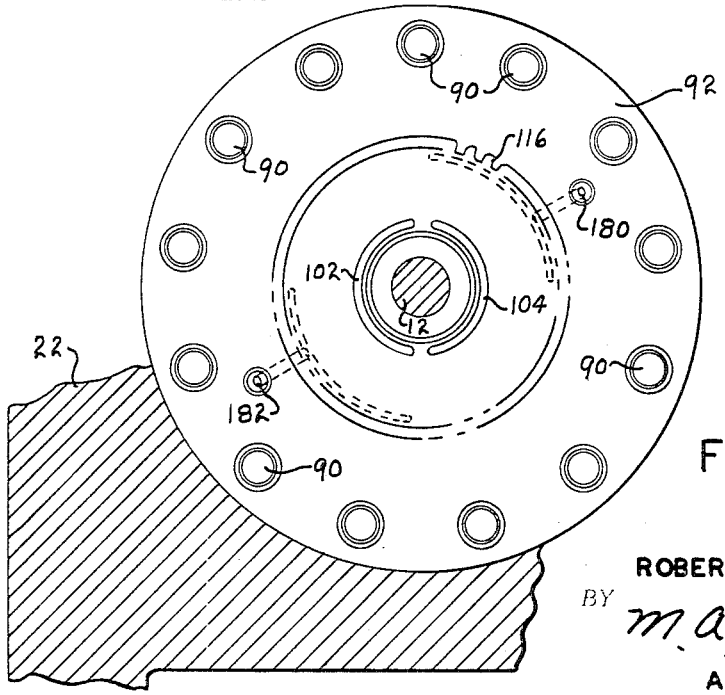
FIGURE 5 is a transverse cross sectional view, taken on line 5—5 of FIGURE 2.
Figure 6:
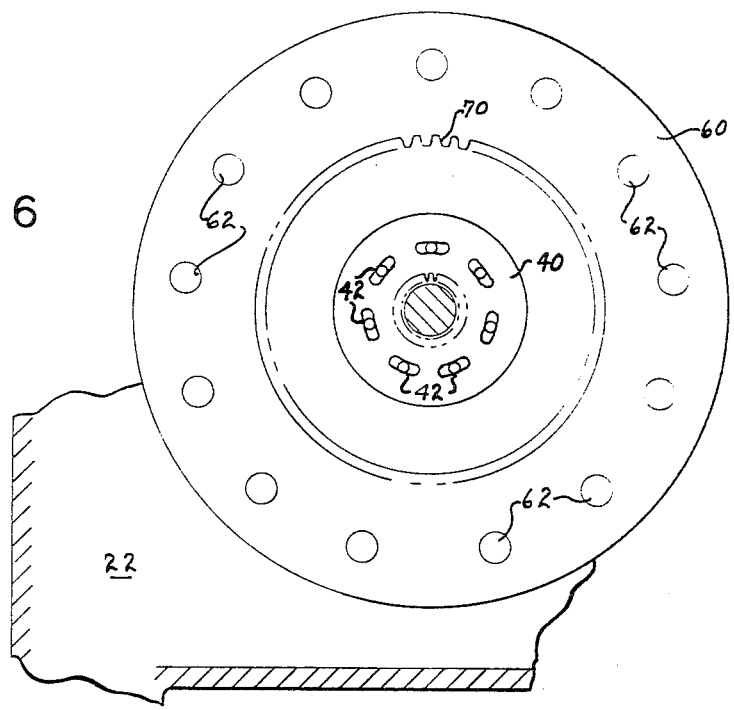
FIGURE 6 is a transverse cross sectional view, taken on line 6—6 of FIGURE 2.
Figure 7:
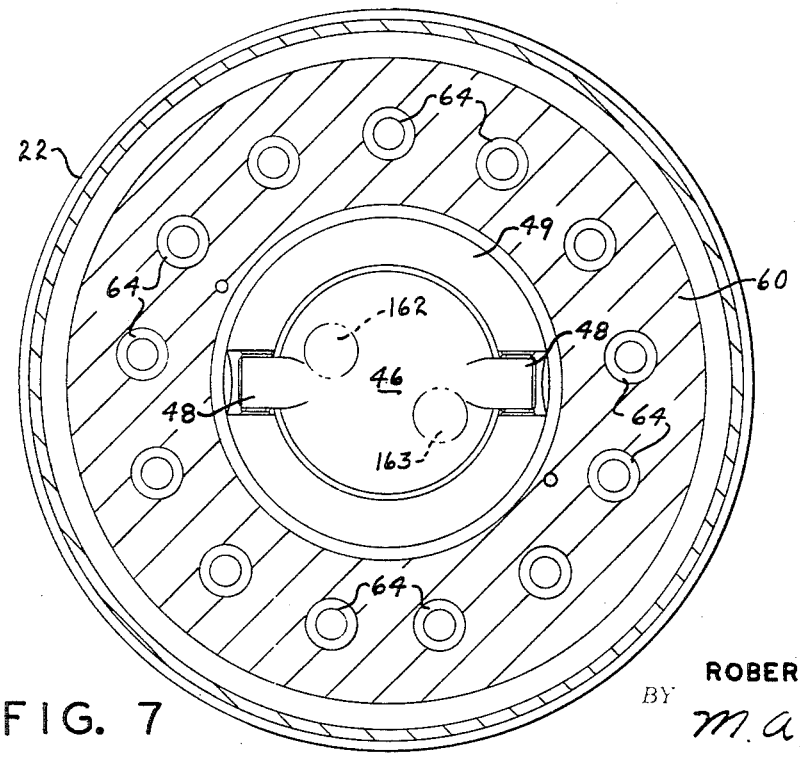
FIGURE 7 is a transverse cross sectional view, taken on line 7—7 of FIGURE 2.

Referring more specifically to the drawings, numeral 10 designates generally the present hydraulic transmission having an input shaft 12 and an output shaft 14. A hydraulic pump generally indicated by the numeral 16 and a hydraulic motor generally indicated by numeral 18 are enclosed in a housing 20, these parts forming, in combination, a control mechanism of a self-contained unit capable of varying the speed and the torque over a wide range. The present hydraulic transmission is driven from any suitable source through shaft 12 and is connected to a driven piece of equipment such as a machine, conveyor, or the like by a power transmission means such as a coupling, pulley and belt, sprocket and chain or gears, mounted on or connected to output shaft 14. The housing may be adapted to various types of applications or installations, the one shown having a generally cylindrical sidewall 22 and end walls 24 and 26. Shaft 12 is journalled in bearing 28 in end wall 24, and shaft 14 is journalled in bearing 30 in end wall 26. Suitable seals 32 and 34 in the respective end walls seal the shafts therein from oil leakage from the housing and/or from ingress of moisture, dirt and other foreign matter into the housing.

Pump 16 is driven by shaft 12 and consists of a body 40 mounted on the inner end of shaft 12 and splined thereto for rotation therewith, and contains a plurality of cylinders 42 in axial position in the body around shaft 12. Each cylinder contains a piston 44 reciprocally mounted therein and caused to reciprocate by a wobble plate 46 mounted on a pair of opposed trunnions generally indicated by numeral 48 as body 40 of the pump revolves. The trunnions are supported by an extension 49 of output shaft 14. The wobble plate is tiltable from a position substantially vertical to various angular positions such as that illustrated in FIGURE 2 to vary the output of pump 16. Each piston reacts against the wobble plate through a shoe 50 and a ball-like end 52 on the piston, the ball end being urged into firm engagement with the respective shoe by the internal pressure in cylinder 42 and the shoe being held firmly in place on the wobble plate by a retainer 54 and a spring 56 reacting between retainer 54 and the inner end of shaft 12. A bleed hole 58 is provided in the end of each piston to supply lubrication for the respective shoe on the wobble plate. As shaft 12 rotates, when the wobble plate is positioned angularly, such as shown in FIGURE 2, pistons 44 reciprocate in the respective cylinders 42, pumping fluid into and from said cylinders through passages interconnecting the cylinders with hydraulic motor 18, as will be more fully explained hereinafter.

Motor 18 rotates output shaft 14 and consists of a generally cylindrical body 60 having a plurality of cylinders 62 therein arranged concentrically with body 40 of pump 16. In the embodiment shown, 13 cylinders are included in body 60, and each cylinder contains a piston 64 reciprocally mounted therein. As the fluid pressure from the cylinders of pump 16 operates pistons 64 in motor 18, the pistons reacting against a fixed plate 66, supported in fixed position in the housing on member 68 cause body 60 to rotate, which in turn, acting through spline 70 and shaft extension 49, rotates output shaft 14. Each piston contains a ball-like end 72, which seats on a shoe 74 riding on the surface of plate 66, and, since the plate is set at an angle with respect to the transverse plane of the motor, the pistons reciprocate between the two positions illustrated in FIGURE 2. A small passage 76 connects cylinder 62 with shoe 74 to lubricate the shoe for free movement of the shoe on plate 66. Body 60 is supported by bearings 78 and 80 and rotates freely in the housing and relative to the rotation of pump 16.

The cylinders of pistons 44 of pump 16 are connected to the cylinders 62 of the motor, in part, by passages 90 in block 92, passage 94 and grooves 96 and 98 in valve plate 100. Block 92 rotates with body 60, and plate 100 is stationary and grooves 96 therein form timing ports in cooperation with adjacent ends of pasages 90. Grooves 102 and 104 and the respective passages 106 and 108 and groove 110 in blocks 112 and 92, alternately connect the pump pistons with groove 98 for communication of the expanding cylinders of the pump with the contracting cylinders of the motor and the contracting cylinders of the pump with the expanding cylinders of the motor. Block 112 which is held in non-rotating position with respect to block 92 by a spline 116, and grooves 110 are separated and sealed by annular gaskets 120, 121 and 122.

In order to supply an effective source of fluid in the operation of the pump and motor, a pump 130 is provided, preferably a positive displacement type, such as that shown in FIGURE 2 having gear 132 mounted on input shaft 12 and gear 134 having a shaft 136 journalled in bearing 138 of end wall 24. The discharge from the pump is carried by passages 140, 142 and 144 to cylinders 42. A check valve 146 prevents back-flow from the cylinders 42 to the pump as pistons 44 contract and pressurize the fluid in cylinders 42. Since pump 130 is driven by the input shaft 12, the pump is in operation throughout the time the transmission is operating to provide a positive pressure source for the operation of the pump and motor.

The output of pump 16 is controlled by varying the position of wobble plate 46. The control mechanism for varying the position of the wobble plate, i.e. rotating the plate to various angular positions on opposed trunnions 48 carried by the output shaft, is shown generally by numeral 160 and consists of a pair of cylinders 162 and 163 and pistons 164 and 165 connected to the wobble plate by ball shaped ends 166 and shoes 168 which ride on the face of the wobble plate and are held firmly thereon by a retainer 170 and spring 172 reacting between the retainer and the inner end of shaft 14. The two pistons 164 and 165 are operated by fluid pressure from the main pressure system of pump 16, the two pistons being connected to the main system by passages 180 and 182, and annular grooves 184 and 186, respectively. The pressure in cylinders 162 and 163 is the same as the pressure in the chambers in the opposed cylinders 42, thus counterbalancing the two pressures so that the mere pressure drop created by a control valve 190 determines the position of the wobble plate.

Control valve 190 regulates the fluid flow to and through cylinders 162 and 163 and hence the pressure in the cylinders. Valve 190 includes a valve element 192 having annular groove 194 for controlling the flow of fluid through passages 196 and 198 to cylinder 162, and an annular groove 200 for controlling the flow of fluid through passages 202 and 204 to cylinder 163. The edges of the two annular grooves in element 192 form a variable restriction for the respective passages and thereby create a variable flow through the valve to carry the pressure in the two cylinders 162 and 163, the flow from the cylinders occurring by seepage around and through the pistons. The position of the wobble plate as controlled by the two pistons 164 and 165 is manually controlled in valve 190 by adjustment element 210 threadedly received in bore 212 in the housing. The valve element 192 is mounted between two coil springs 214 and 216, and as the adjustment element 210 is tightened in bore 212, greater pressure is applied to spring 214, thereby shifting the element to the right as viewed in FIGURE 3 and restricting passages 196 and 202 and hence reducing the flow of fluid to the cylinders. Likewise, turning the adjustment element 210 outwardly in the bore permits the element to return to its original full flow position.

The speed of output shaft 14, in addition to being controlled manually by valve 190, is also controlled automatically by this valve in response to the pressure created by a pump 230, preferably of the positive displacement type such as a gear pump. One gear 232 is splined with shaft 14 and is driven thereby and, in cooperation with gear 234, supplies pressure to port 236 on the left hand side of valve element 192. The intake of the pump is connected by a conduit to port 238 and the two ports are connected by a passage 240 with restriction 242 in element 192. Gear 234 is mounted on a shaft 244 which is journalled in a bearing 246 in body member 68 of the housing. As the speed of shaft 14 increases, the fluid pressure from pump 230 increases, thereby causing valve element 192 to shift to the right, as viewed in FIGURE 3, and restrict the flow of fluid to cylinders 162 and 163, thus causing the pistons 164 and 165 to adjust the wobble plate 46 to a lesser transverse angle, and thereby decreasing the output in pump 16. With the diminished output from pump 16, motor 18 slows down, reducing the speed of shaft 14. If shaft 14 decreases in speed below the desired rate, the reverse of the foregoing operation takes place to increase the output of pump 16 and thereby increase the speed of motor 18 and shaft 14 until the desired speed has again been reached.

One of the important features of the present hydraulic transmission is the direct drive erect between the input and output shafts obtained by the arrangement of control pistons 164 and 165 on the opposite side of the wobble plate from pistons 44. A portion of the rotational force of input shaft 12 is transmitted by pistons 44 through the wobble plate to pistons 164 and 165, imparting a rotational force to shaft 14. Output shaft 14 may rotate in either direction relative to shaft 12 depending upon the position of the wobble plate, either in one direction or the other from a true transverse line through the axis of the trunnions, as controlled by valve 190. If the output shaft is rotating in the same direction as the input shaft, it subtracts from the pump speed, resulting in less pump fluid for a given wobble plate angle. If the output shaft rotation is in the opposite direction to the input shaft rotation, the effective pump speed is increased, thus increasing the pump fluid and output shaft speed. The torque reaction of the pump pistons which are thrust against the wobble plate is added to the output shaft torque. Since the torque is always in the same direction as input shaft rotation, the output torque is greater when the rotation is in the same direction as the input shaft rotation, and the output shaft torque is increased by an amount equal to the input torque level of the unit. The effect of these inner mechanical interactions between the shafts results in approximately 20 percent additional torque for normal shaft speed, and, as the shafts rotate in the same direction, an opposite rotation of the input shaft results in an additional increase in output speed of approximately 20 percent. In addition to the foregoing effect on the speed and torque output this arrangement provides a more compact combination pump and motor, in that the control mechanism for varying the speed and/or torque in the hydraulic system is incorporated in the pump-motor mechanism.

In the operation of the present hydraulic transmission, with shaft 12 being driven by an electric motor or other suitable source of power, and shaft 14 being connected to driven equipment, rotation of shaft 12 rotates body 40 of pump 16, and as the pistons 44 are reciprocated by the inclination of wobble plate 46, fluid is pumped from cylinders 42 into cylinders 62 of motor 18. As the fluid is pumped into one-half of the motor cylinders, the pistons 64 are urged to the right as viewed in FIGURE 2 against fixed plate 66, thereby causing the motor body to rotate. Along with the rotation of the motor, output shaft 14 rotates, as do control mechanism 160, wobble plate 46, block 92, and timing block 112. The desired output shaft speed is selected by adjusting element 210 to vary the position of element 192 in valve 190. After a predetermined speed has been selected, it is automatically maintained by the pressure created in pump 230 as transmitted through ports 236 or 238 into valve 190, thereby varying the position of element 192 in response to changes in speed of shaft 14. During the time that shaft 12 is rotating, the force applied to the angularly positioned wobble plate 46 transmits mechanical force directly to shaft 14, either increasing or decreasing the speed and/or torque of shaft 14 over and above that transmitted in the hydraulic system between pump 16 and motor 18. Whenever it is desired to change the speed of the shaft, adjustment element 210 is rotated either inwardly or outwardly in valve 190, thereby shifting valve element 192 to a new setting to give the desired speed. After the setting has been made, the speed is automatically maintained by the system including the pump 230. Since the input shaft is normally driven at a constant speed, control of the present transmission is effectively performed by merely regulating valve 190 in the manner described above.

While the present hydraulic transmission has been described with reference to a piston type pump and motor, the direct drive concept between the inlet and outlet passages can be embodied in other types of pumps and motors. Various changes and modifications may be made without departing from the inventive concept.

I claim:

1. A hydraulic transmission comprising an input shaft, an output shaft in axial alignment with said input shaft, a pump rotatively driven by said input shaft, a motor driven by said pump and connected to said output shaft, and a control mechanism for said pump having a hydraulic motor and being mechanically connected to said output shaft for transmitting a rotational force between said pump and said output shaft, the output force on the output shaft being composed of both the hydraulic and mechanical forces throughout the operation of the transmission.

2. A hydraulic transmission as defined in claim 1 in which said pump consists of a plurality of cylinders and pistons concentrically arranged with respect to the input shaft.

3. A hydraulic transmission as defined in claim 2 in which said control mechanism includes a wobble plate tiltable at various angles for varying the output of the cylinders and pistons of said pump, and in which said control mechanism includes a cylinder and piston for controlling the angular position of said wobble plate, said cylinder and piston being mechanically connected to said output shaft.

4. A hydraulic transmission as defined in claim 3 in which pressures from said pump operate the piston and cylinder of said control mechanism and in which a manually adjustable valve means controls the pump pressure of the fluid delivered to the cylinder and piston of said control mechanism.

5. A hydraulic transmission as defined in claim 4 in which a fluid pressure creating means is connected to said output shaft for producing a control pressure to control said valve means for varying the pressure of the fluid delivered to the cylinder of said control mechanism in response to the speed of the output shaft.

6. A hydraulic transmission as defined in claim 1 in which said motor includes a rotatable body mechanically connected to said output shaft and containing a plurality of cylinders and pistons for causing said body to rotate in response to pressure from said pump in the cylinders in said body.

7. A hydraulic transmission as defined in claim 3 in which said motor includes a rotatable body mechanically connected to said output shaft and containing a plurality of cylinders and pistons for causing said body to rotate in response to pressure from said pump in the cylinders in said body.

8. A hydraulic transmission as defined in claim 3 in which said motor includes a rotatable body mechanically connected to said output shaft and containing a plurality of cylinders and pistons, and in which an angularly positioned reacted plate is provided for causing said body to rotate in response to pressure from said pump in the cylinders in said body.

9. A hydraulic transmission as defined in claim 1 in which a pressure creating means is driven by said input shaft for delivering fluid at an elevated pressure to said pump.

References Cited

UNITED STATES PATENTS

| | | |
|---|---|---|
| 2,569,562 | 10/1951 | Froebe. |
| 2,788,636 | 4/1957 | Badalini. |
| 3,151,456 | 10/1964 | Swift. |
| 3,161,023 | 12/1964 | Margolin et al. |
| 3,213,620 | 10/1965 | Swift et al. |
| 3,314,234 | 4/1967 | Orshansky. |

EDGAR W. GEOGHEGAN, Primary Examiner

U.S. Cl. X.R.

103—162